W. DALE.
Illuminating Vault and Area Cover.

No. 222,871.   Patented Dec. 23, 1879.

Witnesses:
C. Clarence Poole
Vinton Coombs

Inventor:
William Dale

UNITED STATES PATENT OFFICE.

WILLIAM DALE, OF NEW YORK, N. Y.

IMPROVEMENT IN ILLUMINATING VAULT AND AREA COVERS.

Specification forming part of Letters Patent No. 222,871, dated December 23, 1879; application filed December 2, 1879.

*To all whom it may concern:*

Be it known that I, WILLIAM DALE, of New York, in the county of New York and State of New York, have invented certain new and useful Improvements in Illuminating Vault and Area Covers, of which the following is a specification.

This invention relates to improvements in that class of illuminating-tiles for covering vaults and cellar-areas in which the glass bull's-eyes or lenses are set in a dish-shaped cast-iron perforated plate over the perforations, and secured in place by cement or composition filled into the dish-formed plate, so as to come flush with the upper surfaces of the glass lenses, as shown and described in Letters Patent granted to me March 7, 1871, No. 112,428, and the reissue thereof, No. 8,365, and also in Letters Patent granted to me January 14, 1879, No. 211,297.

Said improvements consist, first, in an improved water-tight joint between the sectional plates or tiles forming the vault or area cover; second, in strengthening the dish-shaped plate by means of a series of ribs of the form herein specified, cast integrally therewith on the upper side thereof, running longitudinally and laterally, so as to form a separate cell for each glass lens, as hereinafter more fully described; third, in an improved composition for a cement or concrete to fill in around and between the lenses in the dish-shaped plate.

Figure 1:
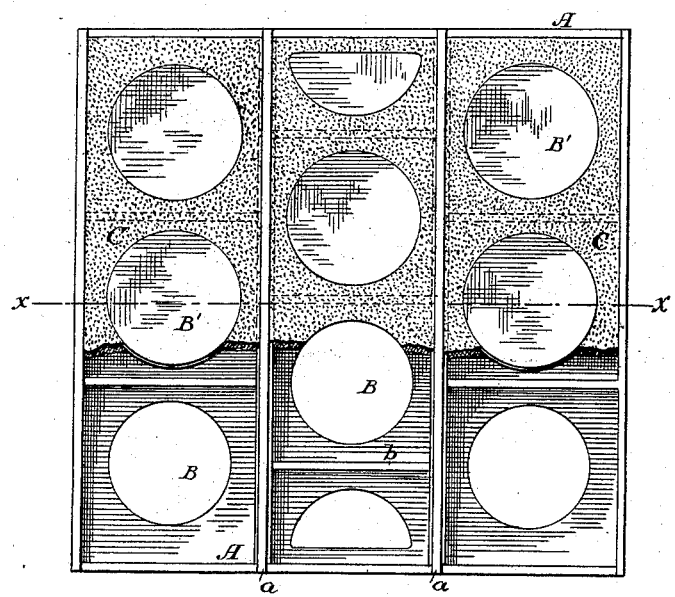
Figure 2:
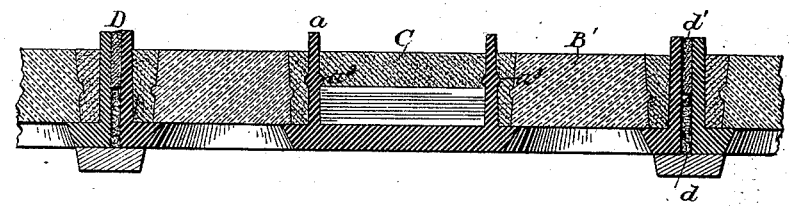
Figure 3:
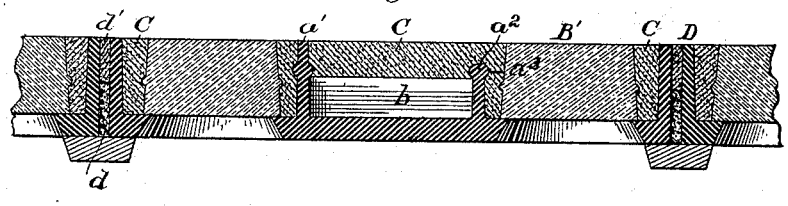

In the accompanying drawings, Figure 1 is a plan view of one sectional plate, in the upper part of which the glass lenses are set in place and the concrete is filled in around them, while in the other part neither the lenses nor the concrete have yet been applied. Fig. 2 is a cross-section of Fig. 1 in line $x\ x$; and Fig. 3 is a similar cross-section, showing one of the longitudinal ribs rising flush with the upper surfaces of the lenses and concrete, and another rising only about two-thirds as high.

I form and set the tiles substantially as described and shown in my said Letters Patent No. 211,297, of January 14, 1879.

In the drawings, A is the dish-shaped cast-iron plate, having apertures B in its bottom, over which the glass lenses B' are placed. C is the composition or concrete.

$a\ a'\ a^2$ are the longitudinal ribs, and $b\ b$ are the lateral or cross ribs. The joints between the sectional plates are shown at D, Figs. 2 and 3.

I have found by experience that when the seams between the sectional plates are filled with ordinary cement they are liable to become open and leaky from the expansion and contraction of the cast-iron plates.

To obviate this defect I fill said seams about half-way up with oakum or other suitable calking material well driven in, and then fill the upper portion with a composition consisting of iron borings, chippings, or filings, a very small quantity of flowers of sulphur, and a solution of sal-ammoniac made by dissolving about one ounce of sal-ammoniac in one gallon of water. This forms a rust-joint, not liable to be affected by the expansion and contraction of the metal plates; or the oakum calking may be omitted, and the seams entirely filled with the iron borings and sal-ammoniac.

In Figs. 2 and 3 the oakum calking is shown at $d$, and the composition of iron borings and sal-ammoniac at $d'$.

To strengthen the sectional plates I cast on the upper side thereof and integrally therewith longitudinal ribs $a\ a'\ a^2$, running between the rows of illuminating-apertures, and short cross-ribs $b$, extending from one longitudinal rib to the next one between each pair of apertures, thus forming a separate cell for each lens.

In a patent granted to me March 3, 1874, I have shown and described ribs cast on the upper side of the tile-plate, crossing each other at right angles between the illuminating-apertures; but said ribs are of dovetail form, thinner at the lower than at their upper edges, which form detracts from their strength. I do not therefore claim, broadly, in this specification longitudinal and cross ribs so arranged as to form separate cells for the lenses irrespective of the form of said ribs; but my improvement consists in casting said ribs of uniform thickness from top to bottom, and casting upon some or all of them longitudinal beads to hold the concrete in place.

The longitudinal ribs may rise a little above the upper surfaces of the lenses and concrete filling, as shown at $a$, Fig. 2, or may come flush with said surfaces, as shown at $a'$, Fig.

3, or may rise only about half or two-thirds of the way toward said surfaces, as shown at $a^2$, Fig. 3. The cross-ribs in all cases rise only about half-way to the upper surface of the concrete, as shown at $b$, Figs. 2 and 3.

For covers in front of stores and other business places, where boxes and the like are frequently deposited, it will be advisable to have the longitudinal ribs rise above the upper surfaces of the glass and concrete, to protect the same, as shown at $a$; but where a smooth even surface is desired said ribs should be made to rise only as high as the concrete, as shown at $a'$, or only a portion of the way up, so as to be entirely covered by the concrete, as shown at $a^2$.

I am aware that illuminating vault-covers made by setting glass lenses in or upon apertures in a cast-iron plate and filling the intervening space with cement or concrete have been constructed with lugs projecting from the plate above the upper surface of the concrete, to protect the glass lenses and the concrete from injury; but as these lugs have heretofore been located they tend to catch and hold dirt, and prevent water from running off freely. But as the tiles are generally laid with a downward incline from the wall, the longitudinal ribs $a$, running at right angles with the wall down the incline, leave a free passage-way for the water falling thereon, and have no tendency to catch or hold dirt. Said longitudinal ribs are each cast with a longitudinal bead, $a^3$, on each side, to hold the concrete firmly in place. This effect has heretofore been accomplished by casting ribs upon the plate, of a dovetail form, thinner at the lower than at the upper edge; but more strength is obtained by casting said ribs of uniform thickness with beads upon them to hold the concrete, as herein shown and described.

I have found that a concrete composed of Portland cement and sand—such as I have heretofore generally used to fill in around and between the lenses—is somewhat liable to absorb water, and to expand and contract, and, by expansion, to break and chip the glass lenses. To obviate this defect, I make a composition consisting of Portland cement, fine sharp sand, and iron borings, chippings, or filings, made into a plastic state by a solution of sal-ammoniac in about the following proportions, (in bulk,) to wit: Portland cement, one part; fine sharp sand, two parts; and iron borings, about one-eighth the quantity of cement.

The solution I make by dissolving about one ounce of sal-ammoniac in one gallon of water. I mix the above-mentioned ingredients with this solution into a soft plastic mass, so thin that it will be sure to fill all cavities and corners in the cellular plate and around the glass lenses. It will set and harden in a short time, the length of time depending, however, to some extent upon the state of the atmosphere.

What I claim as my invention is—

1. In an illuminating vault or area cover composed of sectional tiles, substantially as herein described, the joints between the sectional plates filled with a composition of iron borings and a solution of sal-ammoniac, either with or without a base of oakum or other calking material, as herein set forth.

2. In an illuminating vault or area cover composed of a dish-shaped cast-iron plate or plates with apertures covered by glass lenses and filled in with concrete, as described, longitudinal and cross ribs, cast integrally with the plate, on the upper side thereof, of uniform thickness from top to bottom, some or all of which are provided with longitudinal beads $a^3$, to hold the concrete in place, forming a separate cell for each lens, substantially as shown and described.

3. In an illuminating vault or area cover of the class herein described, the longitudinal ribs $a$, rising above the upper surfaces of the lenses and concrete, substantially as and for the purpose set forth.

4. In an illuminating vault or area cover of the class herein described, the beads $a^3$ on each side of the longitudinal ribs, substantially as and for the purpose set forth.

5. In an illuminating vault or area cover of the class herein described, a concrete for filling in around and between the glass lenses, composed of Portland cement, fine sharp sand, and iron borings, chippings, or filings, in the proportions substantially as herein specified, and mixed into a plastic state with a solution of sal-ammoniac, substantially as set forth.

In testimony that I claim the foregoing I have hereunto set my hand in the presence of the subscribing witnesses.

WILLIAM DALE.

Witnesses:
 ALBERT H. NORRIS,
 JAMES A. RUTHERFORD.